July 21, 1959 D. J. D. PUGSLEY 2,896,092

WAVEFORM GENERATORS

Filed April 25, 1955

Inventor
Donald J. D. Pugsley
By
Holcombe, Wetherill & Brisebois
Attorneys

United States Patent Office 2,896,092

Patented July 21, 1959

2,896,092

WAVEFORM GENERATORS

Donald John Davey Pugsley, Cambridge, England, assignor to Pye Limited, Cambridge, England, a British company Application April 25, 1955, Serial No. 503,621

Claims priority, application Great Britain May 3, 1954

6 Claims. (Cl. 307—88.5)

The present invention relates to waveform generator circuits and more particularly to a circuit arrangement for generating the frame blanking pulses (also called "field blanking pulses") in a television waveform.

In television waveform generators, the line or horizontal synchronising pulses are usually produced from a master oscillator, the output from which is also fed to a divider network which divides by the number of lines per picture. The output pulses from the divider are used to trigger generators for the frame synchronising pulses, blanking pulses and other pulses of the wave form. The present invention provides a circuit arrangement in which the frame blanking pulses may be taken directly from the divider without employing a separate frame blanking generator.

According to the invention, the divider is arranged in two stages, the first stage having a count equal to the number of lines in a frame blanking pulse, and the second stage comprising a plurality of electronic counting units having a count which when multiplied by the first count, produces output pulses at frame frequency or at a low integral multiple thereof, from the input pulses fed to the divider, and at least one of the counting units of the second stage having its output fed to one electrode of a diode associated solely with that unit, the other electrode of the diode or of each diode being connected to a line held at a D.C. potential, the arrangement being such that when an output is produced from any of the counting units connected to a diode the latter will conduct and bring the potential of the line substantially to the output potential of the unit. Thus, whilst an output is delivered through any of the units connected to the line through a diode the line will be held at one potential, but when no output is being produced from any of the said units the line will be held at another potential. The number of diodes is arranged to be such that an output pulse is produced on the line at a repetition rate of the pulse output from the divider and of a duration required for the frame blanking pulses. By the term "electronic counting units" is meant units which count or divide the input pulses to the divider by a certain digit. Preferably each stage of the divider comprises a plurality of interconnected binary electronic counting units.

Figure 1:
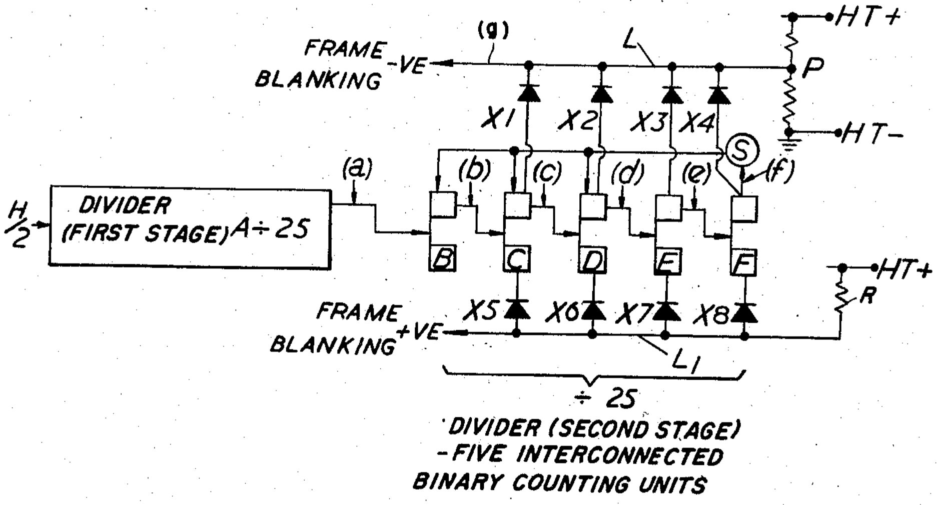

In order that the invention may be more fully understood an embodiment thereof will now be described with reference to the accompanying drawing in which:

Fig. 1 shows a circuit arrangement according to the invention, and

Figs. 2*a* to 2*g* are explanatory wave forms as appearing at the points *a* to *g* indicated on Fig. 1.

The illustrated embodiment shows a divider designed for use in a television system employing 625 lines per picture period in which the first stage of the divider has a count equal to 25 which is the number of lines in a frame blanking pulse and the pulses applied to the input of the divider are of half-line duration. Thus each output pulse from the first stage of the divider is of 25 half-lines duration. The second stage of the divider also has a count equal to 25, thus giving an output pulse for every 625 input pulses of half-line duration fed to the divider. In Figure 1, the first stage of the divider is not shown in detail but may comprise a series of interconnected binary counting units, whilst the second count, as shown, comprises five interconnected binary counter units B, C, D, E and F with feedback connections taken from the last unit F through the buffer stage S to stages B, C, and D thus producing the desired output count of 25. Four diodes X1, X2, X3 and X4 have their anodes connected respectively to the binary units C, D, E, and F and their cathodes connected to an output line L which is held at a predetermined positive potential by connecting it to a point P on a potentiometer network connected across the high tension supply. The diodes may be connected to the tapped anode load of the particular binary unit or any other suitable point. The tapping point P on the potentiometer is arranged such that the voltage of the output line L is approximately the same as the D.C. voltage normally present at the output point from the binary counters, so that when an output above the normal potential of point P occurs from any of the binary units associated with a diode, then that diode will conduct to bring point P up to the potential of the anode. Thus, from Fig. 2 it will be seen that during the interval 1 diode X4 is conducting, during interval 2 dioxide X3 is conducting, during interval 3, diode X2 is conducting and during interval 4, dioxide X1 is conducting. Thus point P will be held positive from the beginning of interval 4 to the end of interval 1, thereby effectively producing a negative-going pulse of interval 5 (Figure 2(*g*)) at a repetition rate of the pulse output of the second count from the divider.

Figure 2:
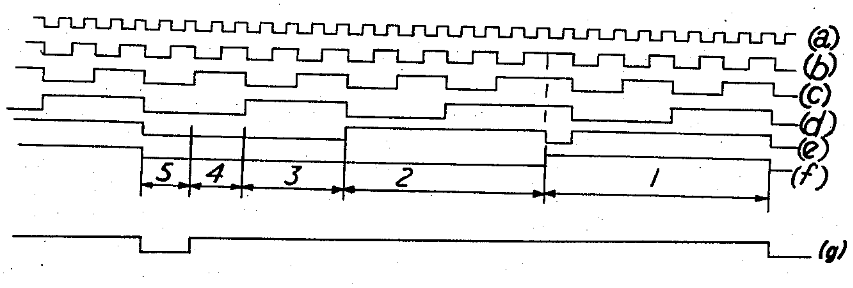

The output interval 5 (produced by the binary counter unit C) is of twice the time interval of the pulses from the first stage (Fig. 2(*a*)) which are, as mentioned previously of 25 half-lines duration. Thus the frame blanking pulse is of 25 lines duration, and is produced for every 625 half-line duration pulses fed to the divider.

A similar arrangement which can be made to give positive frame blanking pulses is also shown in Fig. 1. In this instance the diodes X5, X6, X7 and X8 are arranged with their cathodes connected to the opposite anode of the binary units from that mentioned in the previously discussed arrangement. The diodes have their anodes connected to a line L1 joined to resistor R which is returned to the high tension positive supply. Thus, when any binary anode to which a diode is connected is conducting, a current will flow through the relative diode and cause the line L1, to be reduced in potential. A pulse output is therefore only produced when all the diodes are non-conducting. In the illustrated arrangement this also occurs at interval 5 in Figure 2. The anodes to which these diodes are connected produce waveforms of opposite polarity to those shown in Figs. 2(*c*), (*d*), (*e*) and (*f*).

The term "diode" used throughout this specification and in the following claims is intended to mean a substantially unidirectional conducting device, and such a device preferably comprises a germanium diode, although it will be understood that any other similar device, for example a thermionic diode or a metal rectifier may be employed in the circuits according to the invention.

The arrangement according to the present invention may be employed to produce the frame blanking pulses for any of the television systems at present employed; thus for example in a 525 line system the first count would be 21 and the second count 25; in a 405 line system the first count would be 15 and the second count 27; and in an 819 line system the first count would be 39 and the second count 21; in each case the first count represents the number of lines in the frame blanking pulse.

I claim:

1. A waveform generator for generating the frame blanking pulses in a television waveform comprising line frequency pulses and frame frequency pulses, comprising a divider consisting of a first stage having a count equal to the number of lines in a frame blanking pulse to be produced, and a second stage connected in series with the first stage and itself comprising a plurality of series connected electronic counting units having a count which when multiplied by the first count produces output pulses at a repetition rate equal to a low integral multiple, including the multiple unity of the frame frequency, means for feeding input pulses to the first stage of the divider at at least the repetition frequency of the line pulses in the television waveform, a source of direct current potential, a line connected to said source of direct current potential, at least one diode, a connection between one electrode of each diode and said line, a connection between the other electrode of each diode and respectively one of said counting units of said second stage, means for deriving an output pulse from the line, and the number of diodes being such that said output pulse caused by a change of potential on the line is produced on said line at a repetition rate equal to the pulse output repetition rate of the divider and of a duration required for the frame blanking pulses.

2. A waveform generator for generating the frame blanking pulses in a television waveform comprising line frequency pulses and frame frequency pulses, comprising a divider consisting of a first stage having a count equal to the number of lines in a frame blanking pulse to be produced, and a second stage connected in series with said first stage and itself comprising a plurality of interconnected binary electronic counting units having at least one feedback connection between the units in order to produce a count which when multiplied by the first count produces output pulses at a repetition rate equal to a low integral multiple of the frame frequency, means for feeding input pulses to the first stage of the divider at at least the repetition frequency of the line pulses in the television waveform, a source of direct current potential, a line connected to said source of direct current potential, a plurality of diodes, a connection between one electrode of each diode and said line, a connection between the other electrode of each diode and respectively one of said counting units of said second stage, means for deriving an output pulse from the line, and the number of diodes being such that said output pulse caused by a change of potential on the line is produced on said line at a repetition rate equal to the pulse output repetition rate of the divider and of a duration required for the frame blanking pulses.

3. Apparatus as claimed in claim 2, in which each diode is a germanium diode.

4. A waveform generator for generating the frame blanking pulses in a television waveform comprising line frequency pulses and frame frequency pulses, comprising a divider consisting of a first stage having a count equal to the number of lines in a frame blanking pulse to be produced, and a second stage connected in series with said first stage and itself comprising a plurality of series connected electronic counting units having a count which when multiplied by the first count produces output pulses at a repetition rate equal to a low integral multiple, including the multiple unity of the frame repetition frequency, means for feeding input pulses to the first stage of the divider at at least the repetition frequency of the line pulses in the television waveform, a source of direct current potential, a line connected to said source of direct current potential, at least one diode, each diode having an anode and a cathode, a connection between the cathode of each of said diodes and said line, a connection between the anode of each of said diodes and respectively one of said counting units of said second stage, means for deriving an output pulse from said line and the number of diodes being such that said output pulse caused by a change of potential on the line is produced on said line at a repetition rate equal to the pulse output repetition rate of the divider and of a duration required for the frame blanking pulses.

5. A waveform generator for generating the frame blanking pulses in a television waveform comprising line frequency pulses and frame frequency pulses, comprising a divider consisting of a first stage having a count equal to the number of lines in a frame blanking pulse to be produced, and a second stage connected in series with said first stage and itself comprising a plurality of series connected electronic counting units having a count which when multiplied by the first count produces output pulses at a repetition rate equal to a low integral multiple, including the multiple unity, of the frame repetition frequency, means for feeding input pulses to the first stage of the divider at at least the repetition frequency of the line pulses in the television waveform, a source of direct current potential, a line connected to said source of direct current potential, at least one diode, each diode having an anode and a cathode, a connection between the anode of each of said diodes and said line, a connection between the cathode of each of said diodes and respectively one of said counting units of said second stage, means for deriving an output pulse from said line, and the number of diodes being such that said output pulse caused by a change of potential on the line is produced on said line at a repetition rate equal to the pulse output repetition rate of the divider and of a duration required for the frame blanking pulses.

6. A waveform generator for generating the frame blanking pulses in a television waveform comprising line frequency pulses and frame frequency pulses, comprising a divider consisting of a first stage having a count equal to the number of lines in a frame blanking pulse to be produced, and a second stage connected in series with the first stage and itself comprising a plurality of interconnecting binary electronic counting units having a count which when multiplied by the first count produces output pulses at a repetition rate equal to a low integral multiple, including the multiple unity of the frame frequency, means for feeding input pulses to the first stage of the divider at at least the repetition frequency of the line pulses in the television waveform, a source of direct current potential, a line connected to said source of direct current potential, a plurality of diodes, a connection between one electrode of each diode and said line, a connection between the other electrode of each diode and respectively one of said counting units of said second stage, means for deriving an output pulse from the line, and the number of diodes being such that said output pulse caused by a change of potential on the line is produced on said line at a repetition rate equal to the pulse output repetition rate of the divider and of a duration required for the frame blanking pulses.

References Cited in the file of this patent

UNITED STATES PATENTS

| | | |
|---|---|---|
| 2,474,266 | Lyons | June 28, 1949 |
| 2,486,391 | Cunningham | Nov. 1, 1949 |
| 2,559,499 | Gillette et al. | July 3, 1951 |
| 2,568,918 | Grosdoff | Sept. 25, 1951 |
| 2,576,676 | Elbourn et al. | Nov. 27, 1951 |
| 2,641,696 | Woolard | June 9, 1953 |
| 2,696,556 | Williams | Dec. 7, 1954 |

FOREIGN PATENTS

| | | |
|---|---|---|
| 1,087,126 | France | Aug. 18, 1954 |